United States Patent [19]

Hayashi et al.

[11] 4,091,315

[45] May 23, 1978

[54] SERVOMECHANISM FOR ROTARY TYPE FLYING CUTTING APPARATUS

[75] Inventors: Shigeki Hayashi, Tokyo; Kazukuni Noda, Fujisawa; Shigeru Kusaka, Zama, all of Japan

[73] Assignee: Nusco Kabushiki Kaisha, Tokyo, Japan

[21] Appl. No.: 708,528

[22] Filed: Jul. 26, 1976

[30] Foreign Application Priority Data

Jul. 31, 1975 Japan ................................ 50-93733
Jul. 31, 1975 Japan ................................ 50-93734

[51] Int. Cl.² ............................................. G05B 19/28
[52] U.S. Cl. .................................. 318/603; 318/632; 83/76
[58] Field of Search ................... 318/632, 603; 83/72, 83/73, 74, 75, 76

[56] References Cited

U.S. PATENT DOCUMENTS

| | | | |
|---|---|---|---|
| 3,604,300 | 9/1971 | Allison et al. ........................... | 83/76 |
| 3,802,306 | 4/1974 | Brown et al. ......................... | 83/76 X |
| 3,807,261 | 4/1974 | Couvreur ............................. | 83/76 X |
| 3,917,930 | 11/1975 | Davey et al. ..................... | 318/632 X |
| 4,015,183 | 3/1977 | Miyakita .............................. | 83/76 X |
| 4,020,406 | 4/1977 | Tokuno et al. ....................... | 318/603 |

*Primary Examiner*—B. Dobeck
*Attorney, Agent, or Firm*—Pollock, Vande Sande & Priddy

[57] ABSTRACT

In a servomechanism in which a cutter is rotated by a servomotor to cut a moving member in a predetermined rotational angular range of the cutter and the servomotor is controlled in accordance with the difference between the number of length measuring pulses generated corresponding to the distance of movement of the moving member and the number of rotation measuring pulses generated corresponding to the rotation of the cutter, a correcting signal is read out of a memory with respect to each rotational angular position of the cutter in the above said predetermined rotational angular range. The correcting signal corresponds to the component of unit rotational distance of the cutter in the direction of travel of the moving member at each rotational angular position of the cutter in its predetermined rotational angular range. By the correcting signal, the difference between the number of the length measuring pulses and that of the rotation measuring pulses is decreased, whereby the distance of movement and moving speed of the moving member and the distance of movement and rotating speed of the cutter in the direction of travel of the moving member are made equal to each other.

14 Claims, 6 Drawing Figures

SERVOMECHANISM FOR ROTARY TYPE FLYING CUTTING APPARATUS

BACKGROUND OF THE INVENTION

This invention relates to a servomechanism for a rotary type flying cutting apparatus.

For example, in a pipe mill or the like, there is employed a reciprocatory cutting system in which a moving pipe is cut by a cutter moving together therewith without stopping the pipe at each cutting operation. In such a case, for accurately cutting the pipe into a predetermined length, it is necessary to make the moving speed of the cutter equal to the travelling speed of the pipe. For this purpose, a servo control is usually employed. In the case where the cutter is moved in parallel with the moving pipe, the servo system can be formed relatively easily.

However, in a rotary type flying cutting apparatus in which a cutter rotating like a rotary saw, is revolved to cut a moving member in a certain rotational angular range of the cutter, it is relatively difficult to make the revolving speed of the cutter equal to the travelling speed of the moving member to be cut. Namely, the member to be cut travels in a straight line but the cutter moves in a circle and the component of movement of the cutter along the straight line is required to be made equal to the travelling speed of the moving member.

One object of this invention is to provide a servomechanism for a rotary type flying cutting apparatus which enables a servo control of the length of a member to be cut.

Another object of this invention is to provide a servomechanism for a rotary type flying cutting apparatus which enables a servo control of length measurement and speed.

SUMMARY OF THE INVENTION

According to this invention, in a cutting apparatus in which a moving member is cut by a rotating cutter in a predetermined range of its rotation, length measuring pulses are generated in accordance with the distance of movement of the moving member and rotation measuring pulses are generated in accordance with rotation of the cutter. The difference in number between the length measuring pulses and the rotation measuring pulses is detected by subtracting means and, further, the difference between the abovesaid difference and a set length is detected, by which a servomotor driving the cutter is controlled. A correcting signal is read out from a memory in accordance with the rotational angular position of the cutter in the abovesaid predetermined range of its rotation. By the correcting signal, the difference between the number of the length measuring pulses and that of the rotation measuring pulses is directly or indirectly controlled to decrease, by which the component of movement of the cutter in the direction of travel of the moving member is made equal to the distance of travel of the latter. The correction of the difference between the number of the length measuring pulses and that of the rotation measuring pulses may be performed by increasing the number of the rotation measuring pulses or decreasing the number of the length measuring pulses by the correcting signal. Further, the difference between a rotating speed signal of the cutter and a travelling speed signal of the moving member is detected and, by the detected difference output, the servomotor is controlled, whereby the travelling speed signal or the rotating speed signal are controlled by the abovesaid or another correcting signal with respect to the rotational angle of the cutter in the predetermined range of its rotation. As a result of this, the component of the rotating speed of the cutter in the direction of travel of the moving member and the travelling speed of the moving member are made equal to each other. This ensures accurate cutting of the moving member into the preset length.

This invention will hereinafter be described in conjunction with the following drawings in which like parts are identified by like reference numerals and characters.

DESCRIPTION OF THE PREFERRED EMBODIMENTS

Figure 1:
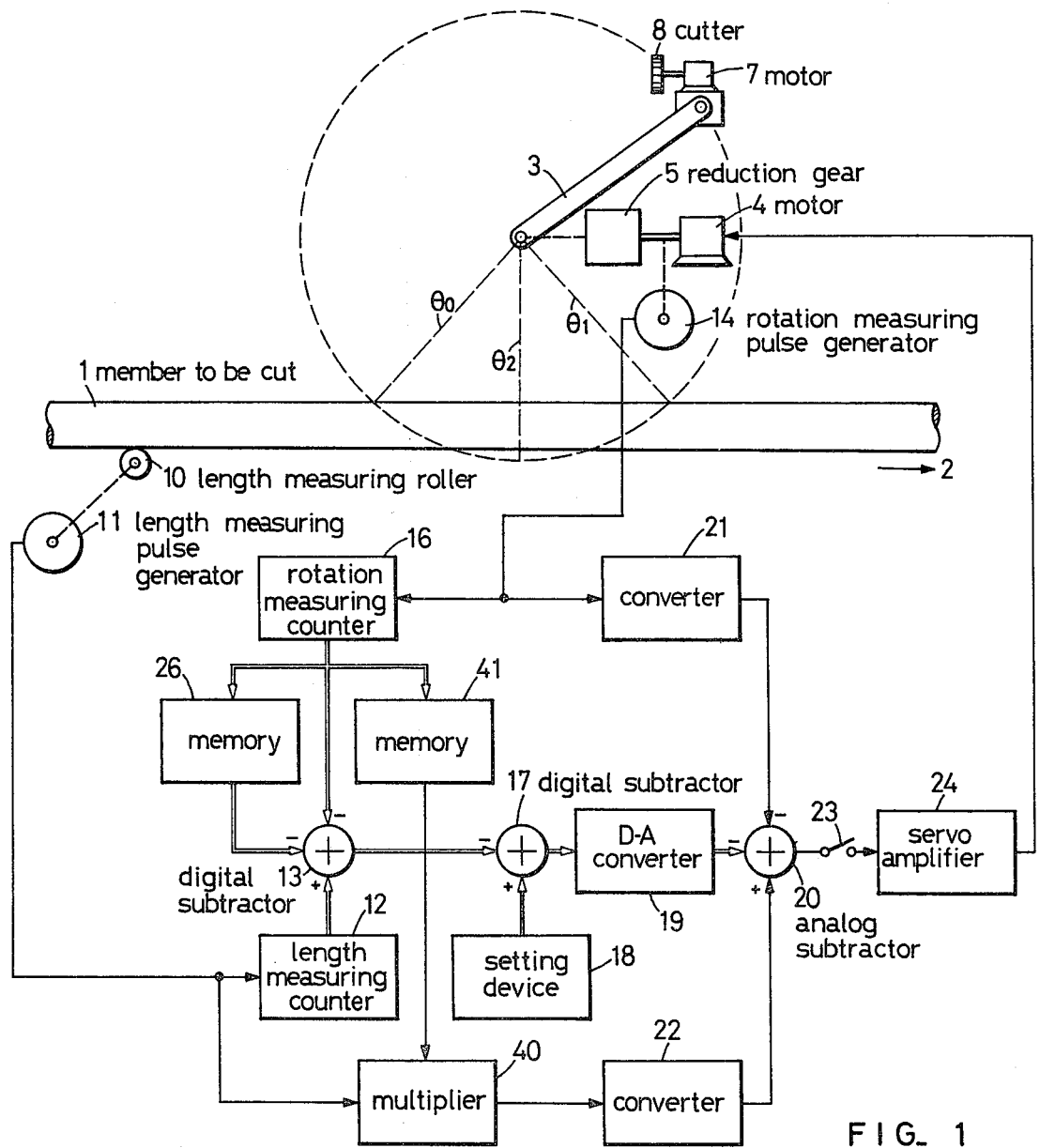
FIG. 1 is a block diagram illustrating one example of a servomechanism for a rotary type flying cutting apparatus according to this invention.

Referring first to FIG. 1, a member 1 to be cut such as, for example, a pipe, is driven in its lengthwise direction, as indicated by the arrow 2. In FIG. 1, means for driving the member 1 to be cut is not shown. For cutting the member 1, a rotary arm 3 is provided which is rotatable about one end thereof and this rotary arm 3 is driven by a motor 4 through a reduction gear 5. At the other end of the rotary arm 3, a motor 7 is mounted in such a manner as to assume the same posture at all times and a cutter 8 is mounted on the rotary shaft of the motor 7.

As the rotary arm 3 rotates, the cutter 8 is brought into contact with the member 1 in a direction which is substantially parallel with the direction of its travel and in which the member 1 is to be cut. In this case, the distance of travel of the member 1 is measured and when the measured value reaches a set value, cutting of the member 1 is carried out. To this and, the rotation of the cutter 8 is controlled such that when the travelling speed of the member 1 changes, the revolving speed of the cutter 8 is adjusted correspondingly to urge the cutter 8 against the member 1 at a position corresponding to the set value. Even when the cutter 8 is urged against the member 1 at the predetermined position, if the travelling speed of the cutter 8 in the direction of travel of the member 1 is not equal to the travelling speed of the member 1, the cutter 8 is broken or the member 1 is cut aslant. To avoid this, the movement of the cutter 8 in the direction of travel of the member 1 and the movement of the member 1 are controlled to be in agreement with each other while the cutter 8 is in contact with the member 1 for cutting the latter.

A length measuring roller 10 is held in rotary contact with the member 1 and, by the rotation of the roller 10, a length measuring pulse generator 11 is driven to generate, for example, 10 pulses when the member 1 travels a distance of 1 mm. The pulses are counted by a length measuring counter 12. The count value of the counter 12 is indicative of the distance of travel of the member 1. This count value is supplied to a digital subtractor 13. On the other hand, by the rotation of the motor 4, a rotation measuring pulse generator 14 is driven and pulses derived therefrom are counted by a rotation measuring counter 16. The count value of the counter 16 indicates the rotational angle of the cutter 8. This count value is supplied to the digital subtractor 13 and subtracted from the count value of the length measuring counter 12. The subtracted value is applied to another digital subtractor 17 for subtraction from the value of length set in a setting device 18.

The resulting subtracted value corresponding to the remaining length with respect to the set length is converted by a D-A converter 19 into an analog signal. The converted output is supplied to an analog subtractor 20. Output pulses from the rotation measuring pulse generator 14 are supplied to a converter 21 such as, for example, a filter, and converted thereby into an analog voltage corresponding to the revolving speed of the rotary arm 3, which is supplied from converter 21 to the subtractor 20. Further, pulses from the length measuring pulse generator 11 are converted by a converter 22 into an analog voltage corresponding to the travelling speed of the member 1 and this analog voltage is also supplied to the subtractor 20. As a result of this, the revolving speed signal and the remaining-length signal are subtracted from the member travelling signal, and the subtracted value is supplied through a switch 23 to a servo amplifier 24, the output from which is applied to the motor 4 to drive it.

When the member 1 has travelled a considerable distance to reduce the remaining-length signal, the switch 23 is closed to supply the output from the servo amplifier 24 to motor 4 to start rotation of the rotary arm 3. After one rotation, the cutter 8 resumes its original position and this implies that the cutter 8 does not move relative to the member 1. Since a servo control is achieved so that the cutter 8 may rotate in agreement with the travel of the member 1, the rotation measuring pulses are subtracted from the length measuring pulses, that is, the number of the rotation measuring pulses generated during one rotation of the cutter 8 is subtracted from that of the length measuring pulses. In practice, however, the length set by the setting device 18 is selected such that the number of rotation measuring pulses to be subtracted from that of the length measuring pulses during one rotation of the cutter 8 is previously subtracted from the value of a desired length into which member 1 is cut.

It is arranged that when the cutter 8 has been rotated into contact with the member 1 as described above, that is, when the rotary arm 3 forms and angle $\theta_0$ with the vertical line passing through its center of rotation, the distance of movement of the member 1 and that of the cutter 8 in the direction of travel of the member 1 may coincide with each other. For example, when the member 1 moves a distance of 1 mm to produce 10 pulses, the cutter 8 moves along its path of rotation a distance of 1 mm to generate 8 pulses. Accordingly, when the 10 pulses are applied to the counter 12, 10 rotation measuring pulses are generated by the servo operation, so that the cutter 8 moves along its path of rotation a distance of 1.25 mm and moves a distance of about 1 mm in the direction of travel of the member 1. The rotational movement of the cutter 8 is corrected in accordance with its each angular position while the cutter 8 is in contact with the member 1. In this case, the angular positions of the cutter 8 where it moves into and out of contact with the member 1 are selected to be those in the case where the member 1 to be cut has a maximum diameter and the cutter 8 has not been worn, that is, the cutter 8 has its maximum diameter.

As will readily be understood from FIG. 1, the distance of movement of the cutter 8 in the direction of travel of the member 1 with respect to the unit rotational angle of the cutter 8 in the rotational angular range from $\theta_0$ to $\theta_1$, varies with the rotational angle of the cutter 8. Accordingly, it is necessary that the distance of travel of the member 1 and that of the cutter 8 in the direction of travel of the former in the abovesaid angular range are equal to each other. To this end, for example, when the cutter 8 is in the rotational angular range from $\theta_0$ to $\theta_1$, a memory 26 is read out using the count value of the counter 16 as an address. In the memory 26, the component of movement of the cutter 8 in the direction of travel of the member 1 at each angular position of the cutter 8 is stored in the form of a corrected value coincident with the component of movement of the member 1. For example, when the cutter 8 is at the angular position $\theta_0$, the corrected value selected is 0 and as the cutter 8 further rotates, the corrected value increases. The sum of the corrected value of the count value of the counter 16 is indicative of the distance of travel of the cutter 8 in the direction of movement of the member 1. In this manner, correction of the rotating speed of the cutter 8 at each angle is performed in the angular range from $\theta_0$ to $\theta_1$.

Figure 2:
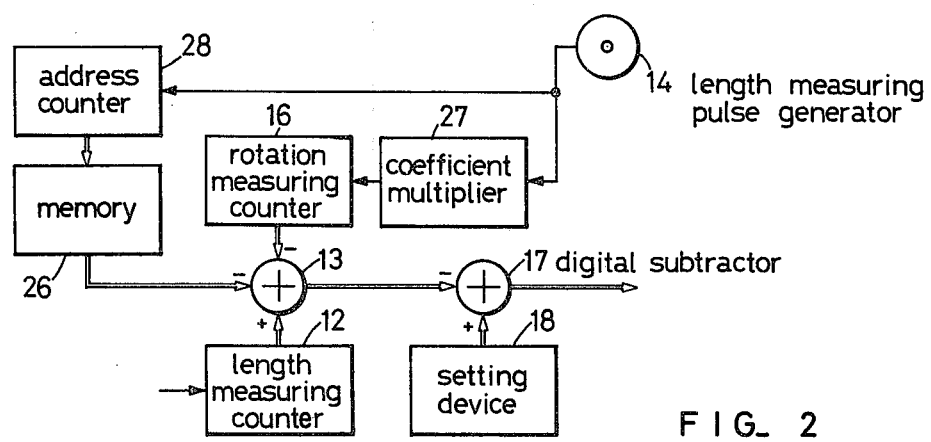
FIG. 2 is a block diagram showing a modification of one part in FIG. 1.

Thus, the distance of movement of the member 1 and the distance of travel of the cutter 8 in the direction of travel of the former are made equal to each other, permitting correct measurement of the length of the member 1 to be cut off. In practice, however, since the gain of the length measuring control loop is not infinity, there is the possibility that the movement of the cutter 8 in the direction of travel of the member 1 does not exactly coincide with the movement of the latter. This can be avoided by correcting the rotating speed of the cutter 8 in such a manner that the speed of movement of the cutter in the direction of the travel of the member 1 may be equal to the travelling speed of the member 1 in the angular range from $\theta_0$ to $\theta_1$. To perform this, the rotating speed of the cutter 8 from its starting position to the rotational angular position $\theta_0$ is selected so that the component of movement of the cutter 8 in the direction of travel of the member 1 may be exactly equal to the travelling speed of the latter at the rotational angular position $\theta_0$. That is, assuming that an increase in the count value of the counter 16 is the same as that of the counter 12, the pulses from the pulse generator 14 are applied to the counter 16 after being subjected to down sampling by a coefficient multiplier 27, as shown in FIG. 2, so that the distance of movement of the cutter 8 in the direction of travel of the member 1 at the angular position $\theta_0$ may be equal to the distance of movement of the member 1. As a rotational angle detecting counter used in such a case, an address counter 28 is provided as shown in FIG. 2.

Further, while the cutter 8 is in the angular range of $\theta_0$ to $\theta_1$, the rotating speed of the cutter 8 is corrected so that its component of motion in the direction of travel of the member 1 may be equal to the travelling speed of the latter. For example, a multiplier 40 is provided at the stage before the converter 22. A memory 41 is read out using the count content of the counter 16 or 28 as an address. The memory 41 has stored therein the relationship between the rotating speed of the cutter 8 at each rotational angle and the component of its movement in the direction of travel of the member 1. The multiplier 40 multiplies the output from the memory 41 by the speed of the member 1 to provide the reference speed for the rotating speed of the cutter 8. If the cutter 8 rotates at the speed specified by the output from the multiplier 40, the speed of the cutter 8 in the direction of travel of the member 1 is equal to the travelling speed of the latter. In practice, the multiplier 40 performs the multiplication of the length measuring pulse by controlling its pulse width or amplitude. For example, a monostable multivibrator is employed as the multiplier 40. The monostable multivibrator is driven by the length measuring pulse and, at the same time, its power source voltage or the constant of its time constant circuit is controlled by the output from the memory 41 to change the amplitude or width of the output pulse, and this output is smoothed by the filter 22, thereafter being supplied to the analog subtractor 20. In this manner, the speed of the cutter 8 in the direction of travel of the member 1 is made equal to the travelling speed of the member 1, ensuring more accurate length measurement and excellent cutting of the member 1.

Although the foregoing description has been given in connection with the case where the rotating speed of the cutter 8 is corrected with respect to the reference speed, it is also possible to insert correcting means in the feedback loop of the rotating speed of the cutter 8. That is, the multiplier 40 is inserted in series with the input side of the converter 21 to control the amplitude or the width of the pulse fed thereto by the output from the memory 41. The content of the memory 41 in this case is opposite to that in the case where the multiplier 40 is connected to the input side of the converter 22. Namely, for example, while the cutter 8 is in the angular range from $\theta_0$ to $\theta_2$, the pulse amplitude or width is smaller than that in the case of the cutter 8 lying at the rotational angular position $\theta_0$ and increases as the cutter 8 approaches the angular position $\theta_2$.

Figure 3:
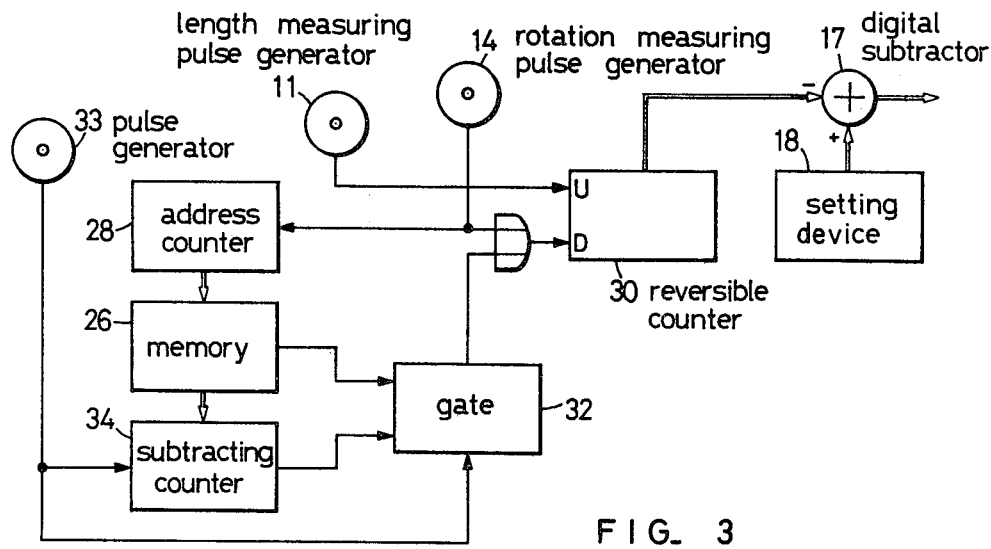
FIG. 3 is a block diagram showing the principal part of another example of this invention in which pulses are generated by correcting means and a reversible counter is used as subtracting means.
Figure 4:
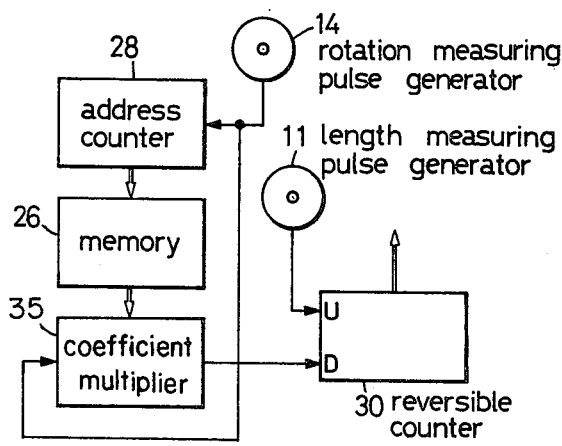
FIG. 4 is a block diagram illustrating the principal part of another example of this invention in which the number of rotation measuring pulses is controlled directly by a corrected value and a reversible counter is used as subtracting means.

For subtracting the number of the rotation measuring pulses from the number of the length measuring pulses, a reversible counter may also be employed in place of the subtractor 13, as shown in FIGS. 3 and 4. That is, as depicted in FIG. 3, the pulses from the length measuring pulse generator 11 are applied to an "up" input terminal of a reversible counter 30 for up-counting and the pulses from the rotation measuring pulse generator 14 are supplied to a "down" input terminal of the counter 30 for down-counting. The pulses from the pulse generator 14 are applied to the address counter 28 and, using its count value, the memory 26 is read out. At the same time as the memory 26 is read out, a gate 32 is opened, through which pulses from a pulse generator 33 are supplied to the "down" input terminal of the reversible counter 30. The output from the memory 26 in preset in a subtracting counter 34, which is supplied with the pulses from the pulse generator 33 for subtraction, and when the content of the counter 34 is reduced to zero, the gate 32 is closed. Thus, the count content of the reversible counter 30 becomes equal to the output from the subtractor 13 in FIG. 1.

Further, in the above, the rotating speed of the rotary arm 3 is corrected by adding the output from the memory 26 to the rotation measuring pulse but the correction may also be performed by multiplication of the rotation measuring pulse. For example, as illustrated in FIG. 4, the pulses from the rotation measuring pulse generator 14 are supplied to the "down" input terminal of the reversible counter 30 through a coefficient multiplier 35. The memory 26 is read out by using the count value of the address counter 28 as an address and, by the output from the memory 26, the multiplied value of the coefficient multiplier 35 is controlled. While the cutter 8 is outside of the angular range from $\theta_0$ to $\theta_1$ in FIG. 1, the memory 26 produces an output smaller than 1 to thin out many of pulses passing therethrough. As the rotary arm 3 approaches the angular position $\theta_2$ from $\theta_0$, the output from the memory 26 approaches 1, and accordingly the number of the pulses to be thinned out decreases. When the rotary arm 3 rotates toward the angular position $\theta_1$ from $\theta_2$, the output from the memory decreases again. The pulses from the coefficient multiplier 35 are supplied to the counter 30.

Figure 5:
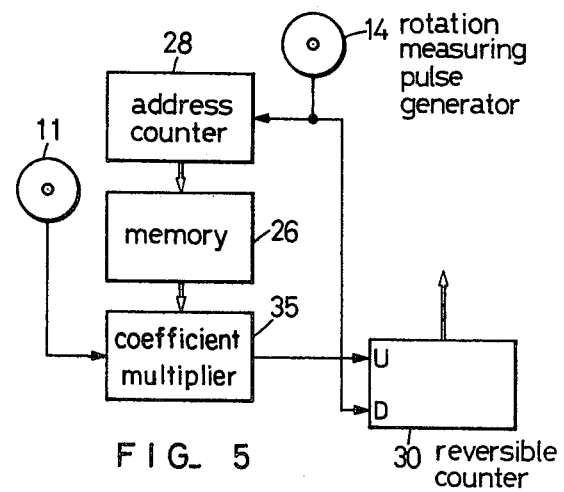
FIG. 5 is a block diagram illustrating the principal part of another example of this invention in which the number of length measuring pulses is controlled directly by a corrected value and a reversible counter is used as subtracting means.

Although the foregoing description has been made with regard to the correction of the rotation measuring pulse, correction of the length measuring pulse may also be possible as shown in FIG. 5, since it is sufficient only to obtain the corrected output from the subtractor 13 or the reversible counter 30 in accordance with each angular of the cutter 8. That is, it is possible to employ such a circuit construction as shown in FIG. 5 for performing a control similar to that in the case of FIG. 4. The rotational angle of the cutter 8 is detected by the address counter 28, by which a coefficient value is read out from the memory 26 to change the coefficient of the coefficient multiplier 35. In the coefficient multiplier 35, the length measuring pulses from the pulse generator 11 are thinned out in accordance with the coefficient value read out from the memory 26. The output from the coefficient multiplier 35 is supplied to the counter 30. The example of FIG. 5 is different from the example of FIG. 4 in the following points. That is, while the cutter 8 rotates to the angular position $\theta_0$, the coefficient value is 1.0; while the cutter 8 rotates from the angular position $\theta_0$ to $\theta_2$, the coefficient value decreases; and while the cutter 8 rotates from the angular position $\theta_0$ to $\theta_1$, the coefficient value increases toward 1.0. In this case, the memory 41 for correction of the speed is unnecessary and the corrected member travelling speed can be obtained only by applying the output pulse from the coefficient multiplier 35 to the converter 22. Namely, any other memory than the memory 26 is not required.

Figure 6:
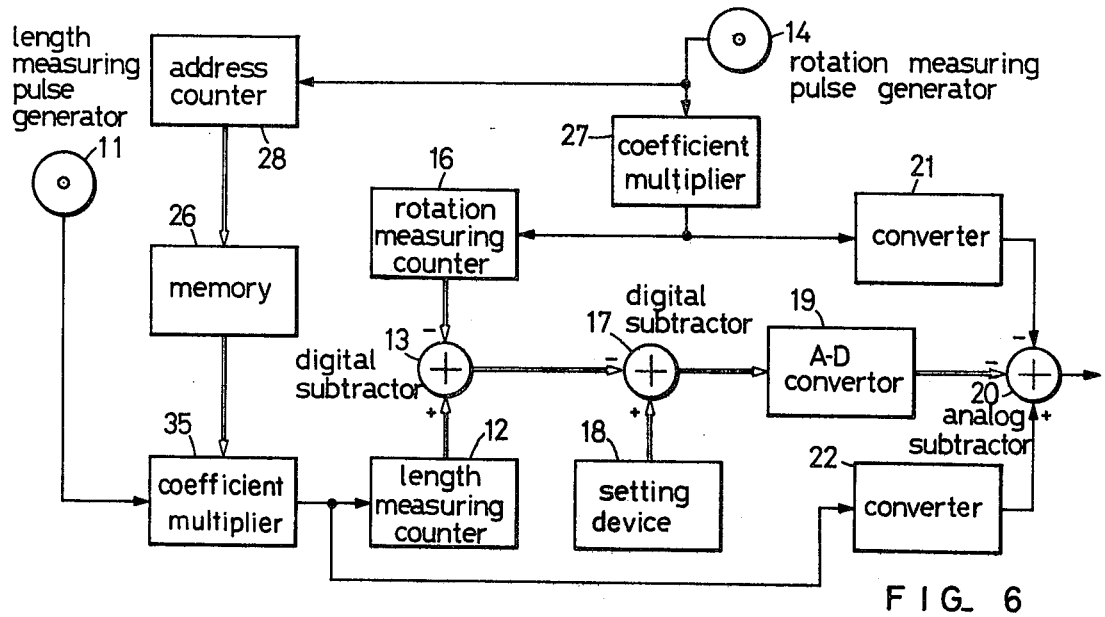
FIG. 6 is a block diagram showing the principal part of another example of this invention in which the number of length measuring pulses is controlled directly by a corrected value and a digital subtractor is employed as subtracting means.

In the case of employing the subtractor 13 in place of the reversible counter 30, such a circuit construction as depicted in FIG. 6 is used in which the rotational angle of the cutter 8 is corrected on the side of the length measuring pulse. The rotation measuring pulses are counted by the address counter 28 to detect the rotational angle of the cutter 8 and, by the address corresponding to the detected angle, the coefficient value is read out from the memory 26. And the coefficient multiplier 35 is set to have a thinning-out coefficient corresponding to the device in the rotational angular range from $\theta_0$ to $\theta_1$. In the coefficient multiplier 35, the length measuring pulses are thinned out and its output pulses are counted by the counter 12. In the subtractor 13, the count value is subtracted from the count value from the rotation measuring pulse counter 16. After all, the output value of the subtractor 13 is equal to that in the case of FIG. 1. Further, when the output pulses from the coefficient multiplier 35 are converted by the converter 22 into an analog voltage, the resulting output is equal to the output from the converter 22 employed in FIG. 1. Accordingly, any other memory other than that 26 is not required in this case, too.

As has been described in the foregoing, this invention enables a servo control of the length measuring operation in the rotary type flying cutter and ensures accurate cutting and smooth cutting planes.

What is claimed is:

1. A servomechanism for rotary type flying cutting apparatus comprising:
    a cutter rotating into contact with a member moving in a straight line in a predetermined range of rotation of the cutter for cutting the member;
    a servomotor for driving the cutter;
    a length measuring pulse generator for generating length measuring pulses corresponding in number to the distance of movement of the moving member;
    a rotation measuring pulse generator for generating rotation measuring pulses corresponding in number to the rotation of the cutter;
    subtracting means for obtaining the difference between the number of the length measuring pulses derived from the length measuring pulse generator and the number of the rotation measuring pulses derived from the rotation measuring pulse generator;
    a setting device for setting therein a set length corresponding to a desired cutting length of the moving member;
    a digital subtractor for detecting the set length and the result of subtraction by the subtracting means;
    a D-A converter for converting the result of subtraction by the digital subtractor and supplying it as a control signal to the servomotor;
    a memory for storing therein a corrected value corresponding to the component of unit distance of movement of the cutter in the direction of travel of the moving member with respect to each angular position of the cutter in the predetermined range of rotation of the cutter;
    address signal generating means for generating an address signal for reading out the memory in accordance with the rotational angular position of the cutter in the predetermined range of rotation of the cutter; and
    means for correcting the difference between the number of the rotation measuring pulses and the number of the length measuring pulses by the corrected value read out from the memory so that the distance of movement of the moving member and the component of the movement of the cutter in the direction of travel of the moving member may be equal to each other in the predetermined range of rotation of the cutter.

2. The servomechanism according to claim 1, which further includes a rotation measuring counter for counting the rotation measuring pulses, the correcting means being a digital adder for adding together the count value of the rotation measuring pulse counter and the corrected value from the memory.

3. The servomechanism according to claim 1, which further includes a length measuring counter for counting the length measuring pulses, a rotation measuring counter for counting the rotation measuring pulses, and another digital subtractor for subtracting the count value of the length measuring counter, and the count value of the rotation measuring counter and the corrected value from the memory one from the other, the correcting means and the subtracting means being combined together.

4. The servomechanism according to claim 1, which further includes means for generating correcting pulses corresponding in number to the corrected value from the memory, and a reversible counter performing the functions of subtracting means and correcting means for counting the correcting pulses and the rotation measuring pulses and for counting the length measuring pulses backward.

5. The servomechanism according to claim 1, which further includes a coefficient multiplier serving as correcting means for multiplying the corrected value from the memory by the number of rotation measuring pulses to decrease the number of the pulses, and a reversible counter serving as subtracting means for counting the output pulses from the coefficient multiplier and counting the length measuring pulses backward.

6. The servomechanism according to claim 1, which further includes means for obtaining a moving speed signal corresponding to the travelling speed of the moving member, means for obtaining a rotating speed signal corresponding to the rotating speed of the cutter, and an analog subtractor for obtaining the difference between the moving speed signal, and the rotating speed signal and the output from the D-A converter and supplying the difference to the servomotor.

7. The servomechanism according to claim 1, which further includes a coefficient multiplier serving as correcting means for multiplying the corrected value from the memory by the length measuring pulses to decrease the number of the pulses, and a reversible counter serving as subtracting means for counting the output pulses from the coefficient multiplier and counting the rotation measuring pulses backward.

8. The servomechanism according to claim 7, which further includes means for obtaining a mean analog signal of the pulses from the coefficient multiplier as a corrected member moving speed signal, means for obtaining a rotating speed signal corresponding to the rotating speed of the cutter, and an analog subtractor for obtaining the difference between the corrected member moving speed signal, and the rotating speed signal and the output from the D-A converter and supplying the difference to the servomotor.

9. The servomechanism according to claim 1, which further includes a coefficient multiplier serving as correcting means for multiplying the corrected value from the memory by the length measuring pulses, a length measuring counter for counting the output pulses from the coefficient multiplier, a rotation measuring counter for counting the rotation measuring pulses, and a digital subtractor serving as the subtracting means for effecting subtraction between the count value of the length measuring counter and the count value of the rotation measuring counter.

10. The servomechanism according to claim 9, which further includes means for obtaining a mean analog signal of the pulses from the coefficient multiplier as a corrected member moving speed signal, means for obtaining a rotating speed signal corresponding to the rotating speed of the cutter, and an analog subtractor for obtaining the difference between the corrected member moving speed signal, and the rotating speed signal and the output from the D-A converter and supplying the difference to the servomotor.

11. The servomechanism according to claim 6, which further includes another memory for storing a speed correcting signal corresponding to the component of the rotating speed of the cutter in the direction of travel of the moving member at each rotational angular position of the cutter in the predetermined range of rotation of the cutter, said another memory being read out by the address signal, and speed correcting means for correcting one of the rotating speed signal and the moving speed signal supplied to the analog subtractor in accordance with the correcting signal from said another memory.

12. The servomechanism according to claim 11, wherein the moving speed signal is obtained by converting the length measuring pulses by the D-A converter into an analog signal, the speed correcting means being a multiplier for controlling by a speed correcting signal at least one of the amplitude and width of the length measuring pulses supplied to the D-A converter.

13. The servomechanism according to claim 11, wherein the rotating speed signal is obtained by converting the rotation measuring pulses by another D-A converter into an analog signal, the speed correcting means being another multiplier for controlling by a speed correcting signal at least one of the amplitude and width of the rotation measuring pulses supplied to said another D-A converter.

14. The servomechanism according to claim 3, which further includes a coefficient multiplier for multiplying the rotation measuring pulses by a predetermined number and supplying the multiplied value to the rotation measuring counter so that the component of the distance of rotation of the cutter in the direction to travel of the moving member may be equal to the distance of the moving member at the beginning of the predetermined range of rotation of the cutter, and another counter serving as the address signal generating means for counting the rotation measuring pulses and supplying the address signal to the memory.

* * * * *